(12) United States Patent
Cao et al.

(10) Patent No.: US 12,099,904 B2
(45) Date of Patent: Sep. 24, 2024

(54) UNIFORM ARTIFICIAL INTELLIGENCE MODEL CONVERSION

(71) Applicant: International Business Machines Corporation, Armonk, NY (US)

(72) Inventors: Li Cao, Beijing (CN); WeiFeng Zhang, Shenzhen (CN); Fei Fei Li, Huang Pu (CN); Ren Jie Feng, Shanghai (CN); Han Su, Shanghai (CN); Zhan Peng Huo, Beijing (CN); Zhong Hao Wang, Dalian (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 869 days.

(21) Appl. No.: 17/197,361

(22) Filed: Mar. 10, 2021

(65) Prior Publication Data
US 2022/0292390 A1    Sep. 15, 2022

(51) Int. Cl.
*G06N 5/04* (2023.01)
*G06N 20/00* (2019.01)

(52) U.S. Cl.
CPC ............. *G06N 20/00* (2019.01); *G06N 5/04* (2013.01)

(58) Field of Classification Search
CPC ................................. G06N 20/00; G06N 5/04
See application file for complete search history.

(56) References Cited

U.S. PATENT DOCUMENTS

2009/0144173 A1    6/2009    Mo et al.

FOREIGN PATENT DOCUMENTS

| CA | 2067484 C | 4/2001 |
| CA | 2703220 A1 | 5/2009 |
| CN | 101000624 A | 7/2007 |
| CN | 105679308 A | 6/2016 |
| CN | 111369011 A | 7/2020 |
| WO | 2009064449 A1 | 5/2009 |

OTHER PUBLICATIONS

Of Instruction Cycle Computer Organization And Architecture, Jan. 22, 2021, pp. 43, https://web.archive.org/web/20210122152358/https://www.learncomputerscienceonline.com/instruction-cycle/.*
Li et al. "The Deep Learning Compiler: A Comprehensive Survey", 2020, pp. 34, arXiv:2002.03794v4.*
(Continued)

*Primary Examiner* — Li Wu Chang
(74) *Attorney, Agent, or Firm* — CANTOR COLBURN LLP; Edward Wixted

(57) ABSTRACT

Aspects of the invention include converting an artificial intelligence (AI) model generated in a first framework to a uniform exchange formatted model by engaging a master table to retrieve instructions for converting from the AI model to the uniform exchange formatted model in accordance with the first framework. The uniform exchange formatted model in compiled by engaging the master table to retrieve instructions for compiling the uniform exchange formatted model in accordance with the first framework. Data is received as an input to the compiled uniform exchange formatted model and an output is generated by engaging the master table to retrieve instructions for generating the output in accordance with the first framework.

25 Claims, 11 Drawing Sheets

(56) References Cited

OTHER PUBLICATIONS

Anonymous, "Amazon SageMaker." https://aws.amazon.com/sagemaker. 15 Pages.

Anonymous, "ONNX Runtime." https://microsoft.github.io/onnxruntime/about.html. 2 Pages.

Anonymous, "TwinCAT 3 | Machine Learning and Neural Network Inference Engine." Beckhoff, Published Date: Sep. 17, 2020. 21 Pages.

B. Raj, "How to deploy ONNX models on NVIDIA Jetson Nano using Deep Stream," Towards Data Science. Published Date: Dec. 5, 2019. 15 Pages.

Y. Tang et al., "Onnx R," https://onnx.ai/onnx-r/. 2 Pages.

* cited by examiner

| Category 206a | Item 206b | Remark 206c |
|---|---|---|
| Model converter/ compiler/inferencing information | Model name | Basic information |
| Model converter/compiler information | Data type | Data information |
| Model converter information | Framework type | Model/framework dependent |
| Model converter information | Framework library/tool | Framework dependent |
| model converter information | Framework method | Framework dependent |
| Model compiler/inferencing information | Input name | Model dependent |
| Model compiler/inferencing information | Output name | Model dependent |
| Model inferencing information | Pre-processing 302 | Model/framework dependent |
| Model inferencing information | Post-processing 304 | Model/framework dependent |
| Model compiler information | optimization | Model/environment dependent |
| Model converter/ compiler/inferencing information | accelerator | CPU/GPU/ CUDA/gGraph/TensorRT,... etc. |

UNIFORM ARTIFICIAL INTELLIGENCE MODEL CONVERSION

BACKGROUND

The present invention generally relates to programmable computing systems, and more specifically, to programmable computing systems configured for uniform artificial intelligence model conversion.

Artificial intelligence algorithms enable a programmable computing system to be trained to learn from data through the use of models. The system is trained by providing the algorithms with training data sets, which the algorithms use to create a precise model for learning. After a model is trained on the data sets, it can be deployed to provide decision making assistance in real-world applications.

SUMMARY

Embodiments of the present invention are directed to a computer-implemented method for uniform artificial model intelligence conversion. The computer-implemented method includes converting an artificial intelligence (AI) model generated in a first framework to a uniform exchange formatted model by engaging a master table to retrieve instructions for converting from the AI model to the uniform exchange formatted model in accordance with the first framework. The uniform exchange formatted model in compiled by engaging the master table to retrieve instructions for compiling the uniform exchange formatted model in accordance with the first framework. Data is received as an input to the compiled uniform exchange formatted model and an output is generated by engaging the master table to retrieve instructions for generating the output in accordance with the first framework.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 illustrates a block diagram of a master table for use with an inferencing phase for an artificial intelligence model in accordance with one or more embodiments of the present invention;

The diagrams depicted herein are illustrative. There can be many variations to the diagrams or the operations described therein without departing from the spirit of the invention. For instance, the actions can be performed in a differing order, or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computing systems, and computer program products for converting an artificial intelligence (AI) model into a uniform exchange formatted model regardless of a framework used to generate the AI model.

Developers use tools, such as machine learning/deep learning frameworks (e.g., TensorFlow™ and Pytorch™), to generate an AI model and to train the AI model. Training an AI model involves providing the AI model with training data as an input and then fine-tuning the AI model based on an output. After the training phase has concluded, the developers initiate the inferencing phase, which includes providing the trained AI model with real-world data to generate an output and assessing the AI model in a real-world situation. Currently, within the common lightweight reasoning method not relying on the training framework runtime, developers perform the inferencing phase by manually converting the AI model from the original framework format to a uniform exchange formatted intermediate representation (IR). The uniform exchange formatted model is further converted to a low-level intermediate representation model, for example an LLVM IR. The developers then access an executable library to perform the inferencing process from the LLVM IR. This manual conversion of the AI model is a labor-intensive task that includes framework-specific pre-processing and post-processing requirements.

One or more embodiments of the present invention address one or more of the above-described shortcomings by providing computer-implemented methods, computing systems, and computer program products that identify the framework-specific configuration of an AI model prior to converting the model into a uniform exchange format. After identifying the framework, a master table is used to retrieve framework-specific information for converting the AI model to a uniform exchange formatted model. This permits an intermediate inferencing process using a uniform exchange formatted IR or a kernel IR without having to further convert the model into an LLVM IR or access its associated executable library.

Figure 1:
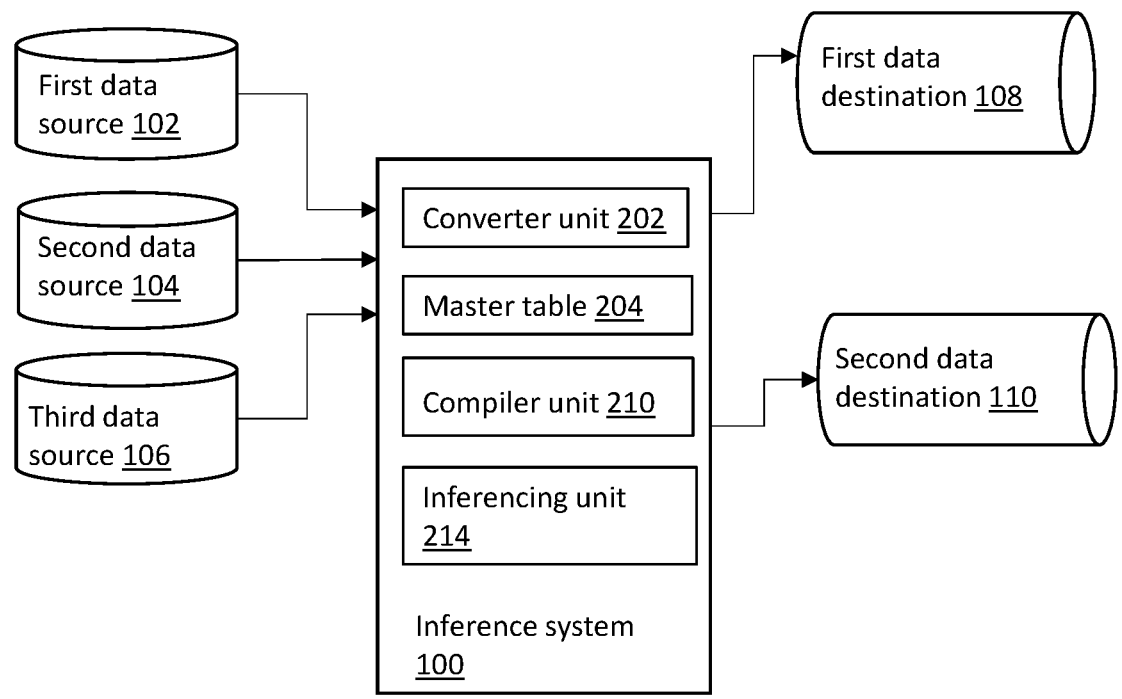
FIG. 1 illustrates a block diagram of components of a system for performing an inferencing phase for an artificial intelligence model in accordance with one or more embodiments of the present invention.

Turning now to FIG. 1, a system 100 for performing an inferencing phase is shown in accordance with one or more embodiments of the present invention. The system 100 is operable to apply input data to an AI model, and cause the AI model to generate an output. The system 100 includes a converter unit 202 for receiving a trained AI model and converting the model from a framework specific model to a uniform exchange formatted model. The system 100 further includes a master table 204, which is a data structure that includes instructions for converting the format of the AI model to a model in the uniform exchange format. The system 100 further includes a compiler unit 210 for converting the uniform exchange formatted model into a lower level language. The system 100 further includes and inferencing unit 214 for receiving live data as an input to the converted uniform exchange formatted model and performing an intermediate inferencing to generate an output in accordance with the trained AI model.

The system 100 is operable to receive the input data from one or more sources, including a first data source 102, a second data source 104, and a third data source 106, (e.g., sensors, an Internet of Things (IoT) device, and/or an upstream application). The system 100 is operable to transmit the output to one or more data destinations, including a first data destination 108 and a second data destination 110 (e.g., a downstream application and a display unit). It should further be appreciated that the system 100 can be implemented via a cloud computing environment 50 as described in FIG. 8, and/or a processing system 1000 as described in FIG. 10.

Figure 2:
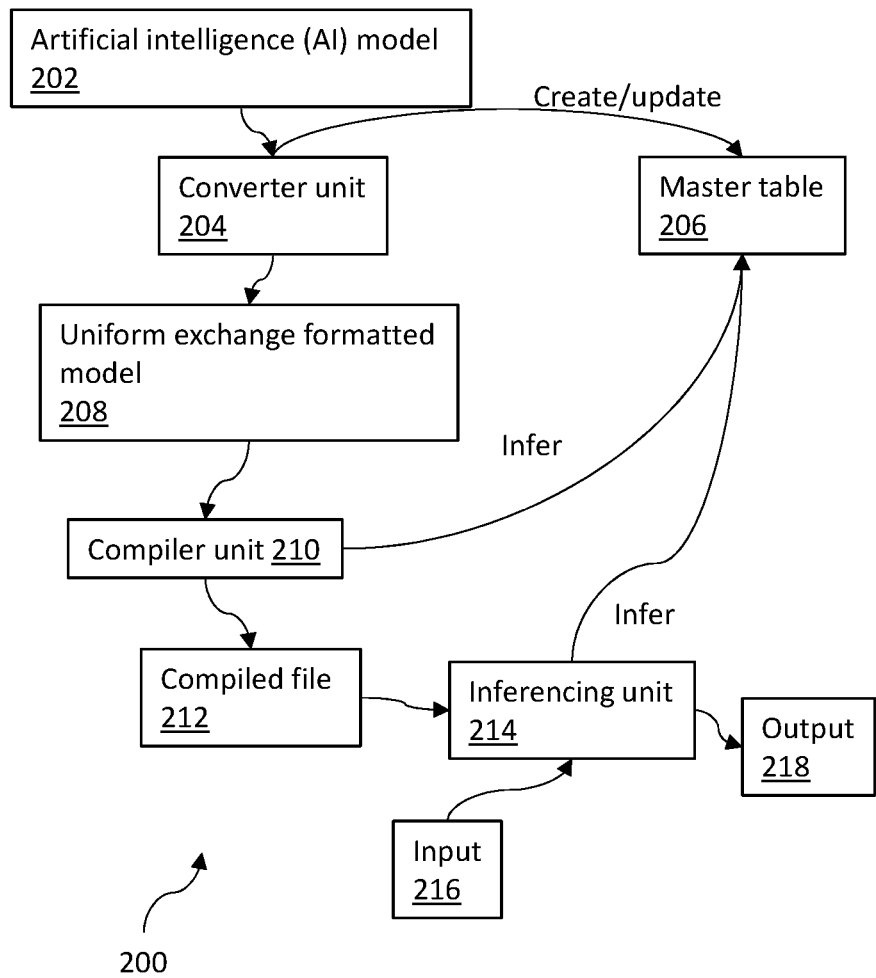
FIG. 2 illustrates a directed chart for performing an inferencing phase for an artificial intelligence model in accordance with one or more embodiments of the present invention.

Referring to FIG. 2, a directed chart 200 of an inferencing phase performed by the system 100 is shown in accordance with one or more embodiments of the present invention. The converter unit 204 is operable to receive an AI model 202 and determine which framework has been used to develop the AI model 202. Once the converter unit 204 determines the framework, it reads a master table 206 to retrieve information for converting the AI model 202 to a uniform exchange formatted model 208. The master table 206 is a data structure that includes a list of framework-specific AI model information that is mapped to information about converting to a uniform exchange formatted model 208 (e.g., an Open Neural Network Exchange (ONNX™) formatted model). The information can include instructions on how to convert the AI model 202 to the uniform exchange formatted model 208. The information can also include structures and objects, such as definitions of extensible computation graph models, built-in operators, standard data types, a suite of uniform exchange formatted optimizers and accelerators. The converter unit 204 assembles a uniform exchange formatted model 208 using the information learned from the master table 206, and transmits the model to the compiler unit 210. The compiler unit 210 converts the uniform exchange formatted model 208 into machine code or assembly language. During the compilation process, the compiler unit 210 reads the master table 206 to learn how to convert the uniform exchange formatted model 208 into machine code or assembly language. The compiler unit 210 uses the machine code or assembly language to generate a compiled file 212 (e.g., an .so file). The compiled file 212 is an intermediate representation (IR) of the uniform exchange formatted model 208. The compiled file 212 is transmitted to the inferencing unit 214 for testing. The inferencing unit 214 receives an input 216 and applies the input 216 to the uniform exchange formatted model 208 to generate an output 218. The output 218 can be transmitted to one or more destinations, for example, the first data destination 108 or the second data destination 110 from FIG. 1.

Referring to FIG. 3, a master table 206 is shown in accordance with one or more embodiments of the present invention. The master table 206 is used to unify the conversion process of AI models generated using different frameworks to a uniform exchange formatted model 208 such as that described in reference to FIG. 2. The master table 206 includes a column 206a for categories of data, a column 206b for specific data items, and a column 206c for any remarks regarding the categories or items. For each entry of AI model information in the master table 206, there is a dynamic mapping to information for converting to a uniform exchange formatted model 208. The information can be framework-specific based on whether the AI model is framework-specific. For example, the pre-processing entry 302 is mapped to information about an associated input method for a uniform exchange formatted model 208 from FIG. 2. As further seen in the remarks column 206c, the pre-processing entry 302 is model/framework specific. Therefore, the pre-processing entry 302 is mapped to information regarding a framework-specific input method for the uniform exchange formatted model 208 from FIG. 2. The master table 206 further includes entries for AI models generated from different frameworks, and thereby reconciles, for example, different framework-specific information, inputs, outputs, pre-processing steps, post-processing steps, optimization levels, accelerators with the uniform exchange format. It should be appreciated that although the illustrated master table 206 includes three columns and twelve rows, in practice, the master table 206 could include greater than three columns and twelve rows.

In some embodiments of the present invention, the master table 206 includes a generational model, for example, an intelligent document analysis model, for building the master table 206. The master table 206 can use the model to apply natural language processing (NLP) techniques to review documents describing a model inferencing process and receive model/framework specific information. For example, the master table 206 can receive electronic documents regarding a MobileNet™ model framework. The master table 206 can apply the generational model and learn that framework type includes a light-weight deep neural network for mobile and embedded vision applications. For example, the documents can further reveal that instructions for pre-processing images include loading the images into a range [0,1] and normalizing the images using mean=[0.485, 0.456, 0.406] and std=[0.229, 0.224, 0.225]. The pre-processing entry 302 in the master table 206 for MobileNet™ is mapped to this information. The master table 206 can also, for example, further determine that post-processing involves calculating SoftMax probability scores for each class and sorting them to report the most probably class. In response to detecting this information, the information, including any narrative text, is written and stored into memory and the post-processing entry 304 in the master table is mapped to this information. The master table can further learn additional framework/model specific information regarding, for example, input and output. The generational model is further trained to associate the instructions from the narrative format found in the electronic documents to code executable by a computing system. For example, by training the generational model to predict machine code or assembly language associated with the narrative text. The machine code or assembly language can be framework or AI model type specific. The entries, (e.g., pre-processing entry 302 and post-processing entry 304) in the master table 206 are further mapped to the code for the respective converter unit 204, compiler unit 210, and inferencing unit 214 to execute the instructions.

The master table 206 provides information items 206b for the converter unit 204, the compiler unit 210, and the inferencing unit 214. As illustrated in FIG. 3, certain information items 206b are for use by one unit of the system 100. For example, the framework type is for the converter unit 204 to retrieve and use. As further illustrated by FIG. 3, other information items 206b are for use by multiple units of the system 100. For example, the input name and the output name are for use by both the compiler unit 210 and the inferencing unit 214.

Figure 4:
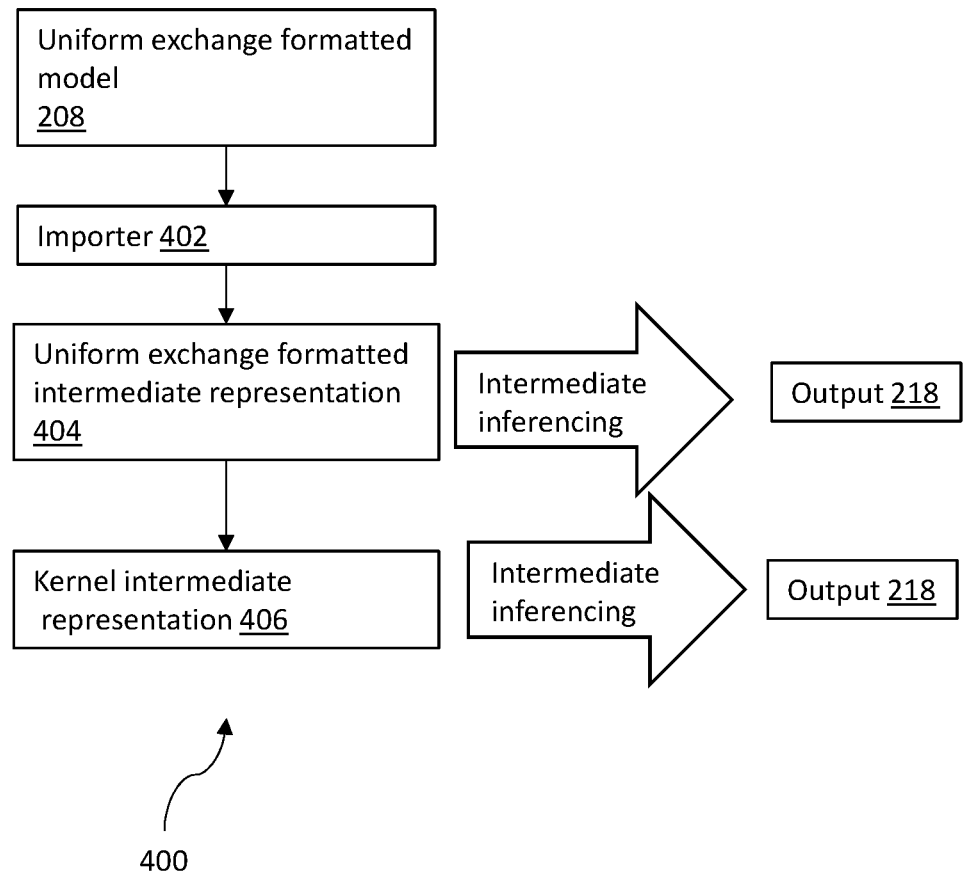
FIG. 4 illustrates a flow diagram of a process for inferencing from a uniform exchange formatted intermediate representation or kernel intermediate representation in accordance with one or more embodiments of the present invention.

Referring to FIG. 4, a flow diagram 400 for generating an output 218 from an intermediate representation (IR) is shown in accordance with embodiments of the present invention. The converter unit 204 transmits the uniform exchange formatted model 208 to an importer 402 of the compiler unit 210. The importer 402 access the master table and converts the uniform exchange formatted model 208 into a uniform exchange formatted IR 404. The compiler unit 210 reads the master table 206 to retrieve model/framework specific optimization information (e.g., an optimizer). The compiler unit 210 further processes the uniform exchange formatted IR 404 using the uniform exchange formatted optimizer, to bridge the uniform exchange formatted IR 404 to a back-end processed architecture (e.g., x86™, PowerPC™, ARM™, S390™, etc.), and generate machine language (e.g., compiled file 212). Converting the uniform exchange formatted IR 404 into machine language allows the inferencing unit 214 to receive the uniform exchange formatted IR 404. At this stage, the inferencing unit 214 can retrieve information from the master table 206 and perform an intermediate inferencing process to generate an output 218. In contrast, in a related system, the uniform exchange formatted intermediate representation 404 would further be converted into a lower level intermediate representation (e.g., and LLVM IR) and then the related system would access an executable library associated with the LLVM IR to perform the inferencing process. However, further translating the uniform exchange formatted IR 404 into a lower level intermediate representation increases the system complexity, increases the required necessary memory storage, and increases the computations performed by the system. By performing the inferencing process directly after generating the uniform exchange formatted intermediate representation 404 without further converting the model to and LLVM IR, the system 100 reduces system complexity, the need for additional memory and storage, and reduces the number of required computations.

In some instances, the uniform exchange formatted IR 404 is further converted into a kernel intermediate representation (IR) 406. For example, if the input 216 is a non-linear data set, the inferencing process may further include incorporating a kernel function as further described below with reference to FIG. 7. Similar to processing the uniform exchange formatted model 208, compiler unit 210 reads the master table 206 to retrieve a framework/model specific kernel optimizer. The compiler unit 210 then processes the kernel IR 406 using the kernel optimizer, to bridge the kernel IR 406 to the back-end processed architectures, and generate machine language (e.g., compiler file 212). Converting the kernel IR 406 into machine language allows the inferencing unit 214 to receive the kernel IR 406. At this stage, the inferencing unit 214 can retrieve information from the master table 206 and perform an intermediate kernel inferencing process to generate an output 218.

Figure 5:
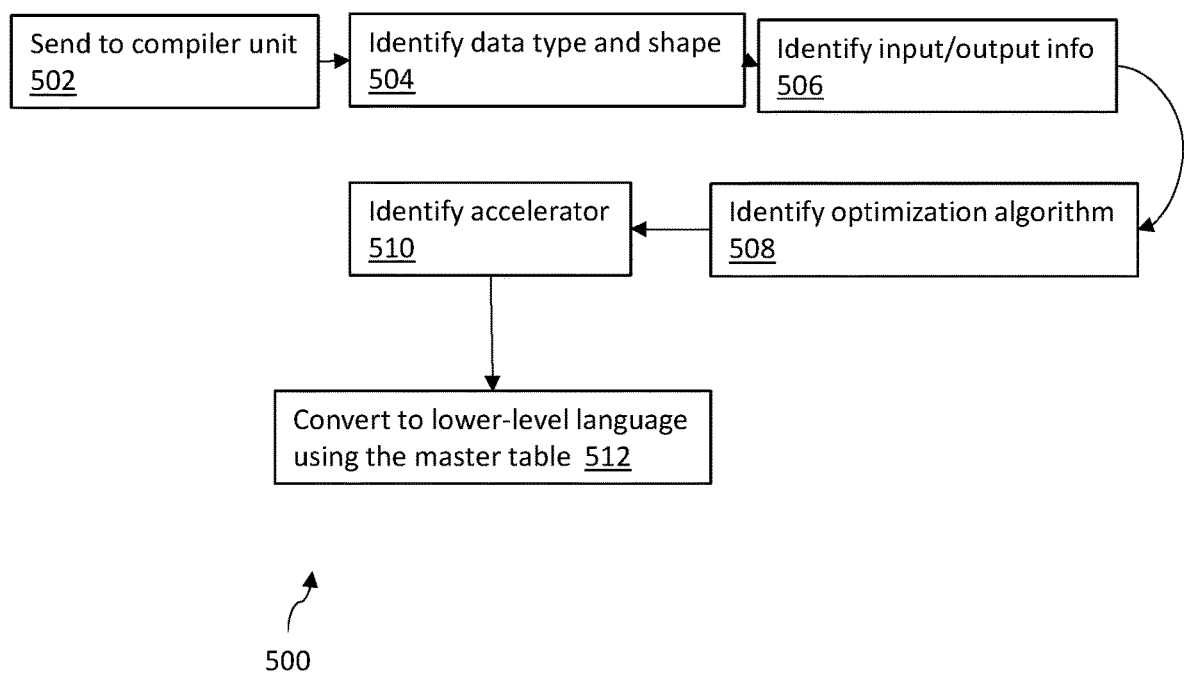
FIG. 5 illustrates a flow diagram of a process for compiling a uniform exchange formatted artificial intelligence model in accordance with one or more embodiments of the present invention.

Referring to FIG. 5, a flow diagram 500 of a compiling process is shown in accordance with embodiments of the present invention. At block 502, a uniform exchange formatted model 208, such as the uniform exchange formatted model 208 of FIG. 2 is introduced to a compiler unit, such as compiler unit 210 from FIG. 2, to convert the model into a lower-level language, such as compiled file 212 of FIG. 2. At block 504, the compiler unit identifies the data type and topology of the uniform exchange formatted mode. Recognizing the data type, allows the compiler unit to understand the intent of the uniform exchange formatted model. Recognizing the topology helps determine the shape of the model, and the shape helps the compiler unit select an appropriate optimization algorithm for the uniform exchange formatted model. At block 506, the compiler unit identifies the input/output information from the uniform exchange formatted model. For example, the input information can include the dimensions of an input layer, and the output information can include the dimensions of an output layer. At block 508, the compiler unit identifies any optimization algorithm associated with the uniform exchange formatted model. At block 510, the compiler unit identifies any accelerator associated with the uniform exchange formatted model 208. At block 512, the compiler unit reads a master table, such as master table 206 of FIG. 2 and retrieves analogous uniform exchange formatted model information in a lower-level language. The compiler unit uses the retrieved information to generate a compiled file, which is transmitted to an inferencing unit, such as inferencing unit 214 from FIG. 2.

Figure 6:
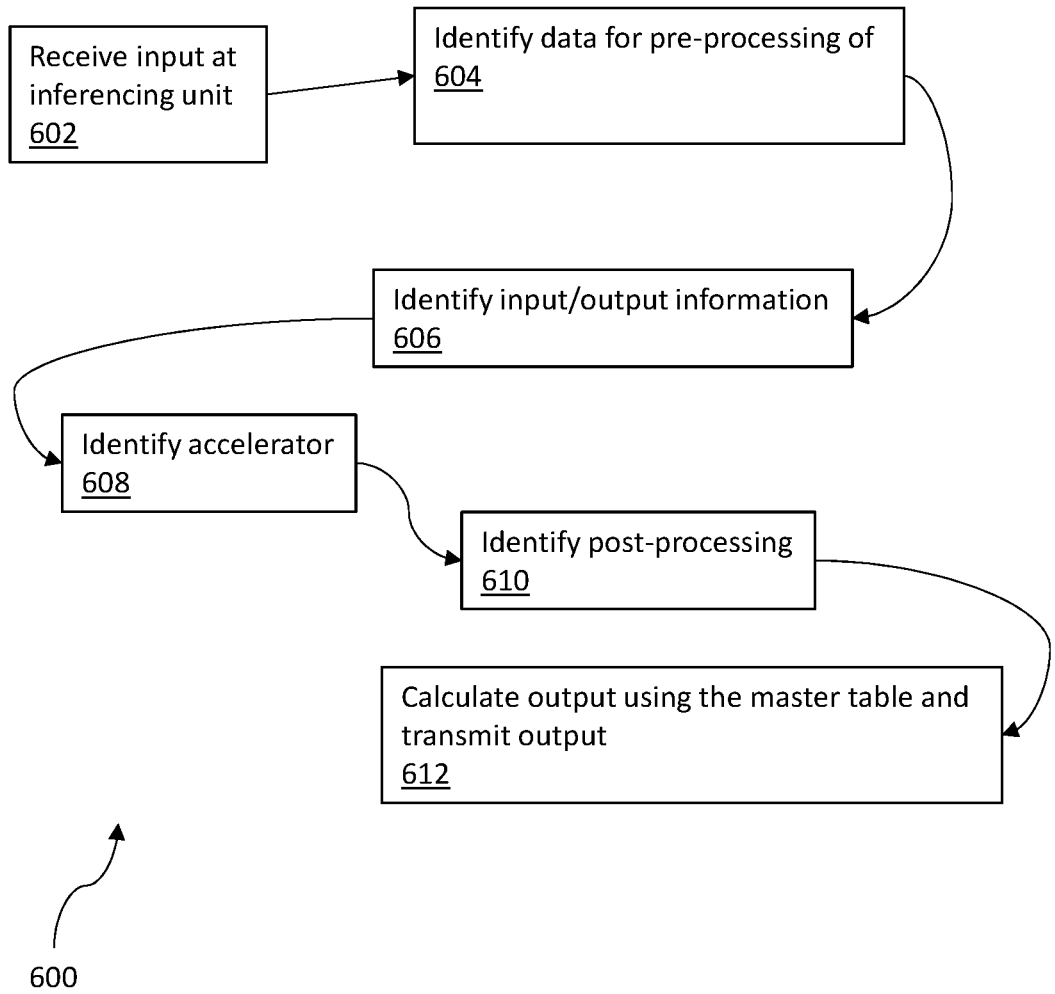
FIG. 6 illustrates a flow diagram of a process performing an inferencing phase for an artificial intelligence model in accordance with one or more embodiments of the present invention.

Referring to FIG. 6, a flow diagram 600 of an intermediate inferencing process is shown in accordance with embodiments of the present invention. At block 602, an inference unit, such as inferencing unit 214 from FIG. 2 receives an input, such as input 216 from FIG. 2, for example, from a data source. The data source can be, for example the first data source 102, the second data source 104, or the third data source 106 from FIG. 1. At block 604, the inferencing unit identifies any data from the input that requires pre-processing. The pre-processing can include, for example, decoding or resizing the data. The inferencing unit then reads a master table, such as master table 206 from FIG. 2, to retrieve framework-specific information as to pre-processing the data. At block 606, the inferencing unit identifies input/output information from the received input. The inferencing unit reads the master table to retrieve information input/output relationship with respect to the uniform exchange format. For example, the information can include a framework-specific relationship between the input data and any output data. At block 608, the inferencing unit identifies an appropriate accelerator software for the inferencing process from the master table. The master table includes multiple accelerator software programs, and the inferencing unit can select an accelerator software based on the framework of the AI model. At block 610, the inferencing unit reads the master table and identifies any framework-specific post-processing algorithms. For example, based on the framework of AI model, the inferencing unit can retrieve a SoftMax function for post-processing data. At block 612, the inferencing unit uses the information retrieved from the master table to generate an output, such as output 218 from FIG. 2, in accordance with an output of the framework of the AI model.

Figure 7:
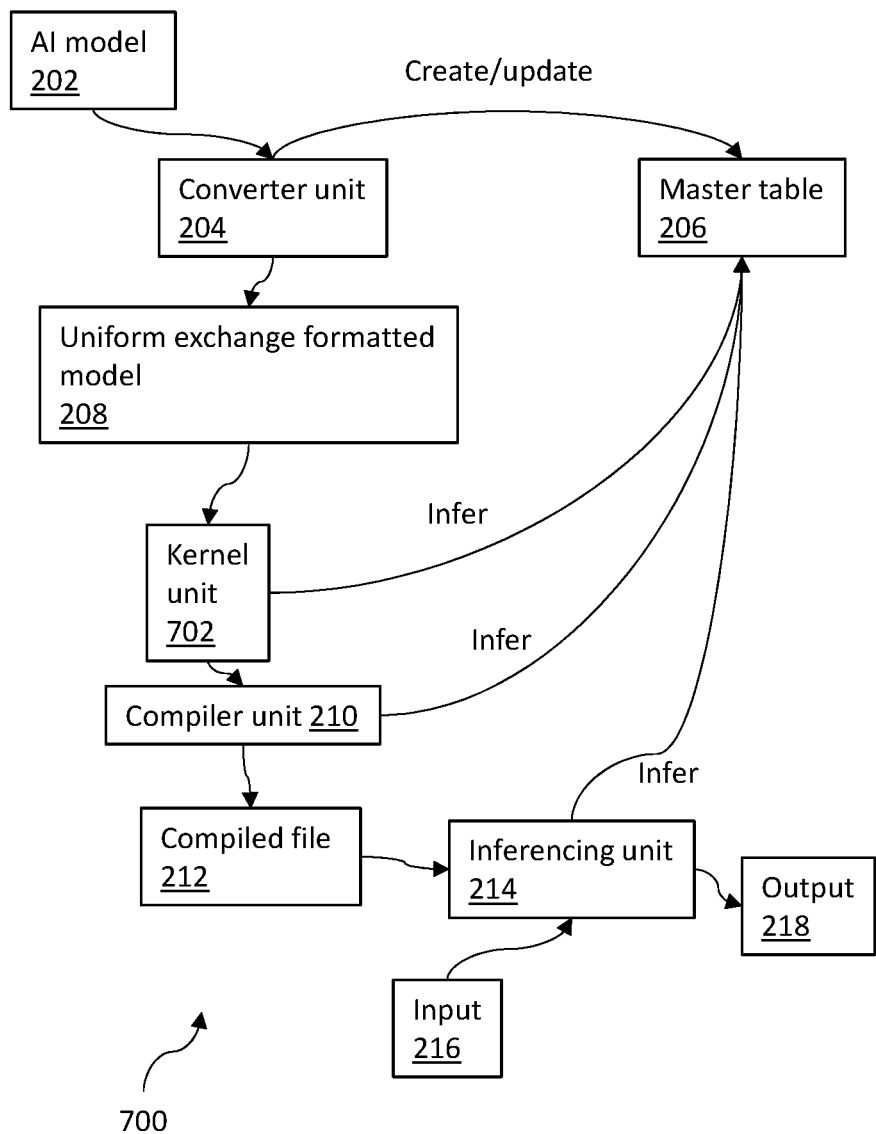
FIG. 7 illustrates a directed chart for performing an inferencing phase for an artificial intelligence model receiving non-linear data in accordance with one or more embodiments of the present invention.

Referring to FIG. 7, a directed chart 700 illustrating an intermediate inferencing process using a kernel function to convert non-linear input data to linear input data is shown in accordance with embodiments of the present invention. In some instances, an AI model, such as AI model 202 from FIG. 2 includes a classifier that is more suitable for linear data (e.g., a support vector machine "SVM"), than non-linear data. In these instances, a kernel function can be applied to transform linearly inseparable data to linearly separable data. As a result, the AI model can still be used to classify the data, without having to exchange the classifier for a classifier more suitable for non-linear data. The AI model is transmitted as an input into a converter unit, such as converter unit 204 from FIG. 2. The converter unit 204 from FIG. 2 assembles a framework-specific uniform exchange formatted model, such as framework-specific uniform exchange formatted model 208 from FIG. 2. Once the uniform exchange formatted model is assembled, the kernel unit 702 can determine whether a classifier of the model is suitable for linear data or for non-linear data. If the kernel unit 702 determines that the classifier is only suitable for linear data, then the kernel unit 702 retrieves a framework-specific kernel function from the master table 206 from FIG. 2. The converter unit then transmits the uniform exchange formatted model and the kernel function to the compiler unit, such as complier unit 210 from FIG. 2, which converts the model into a compiled file 212, such as compiled file 212 from FIG. 2 written in machine code or assembly language. The compiled file is transmitted to the inferencing unit, such as inferencing unit 214 from FIG. 2 to test the model. The inferencing unit receives an input, such as in the form of non-linear data sets. The non-linear data can be received from, for example, the first data source 102, second data source 104, or third data source 106 from FIG. 1. Based on the input, the inferencing unit generates an output, such as output 218 from FIG. 2.

Figure 8:
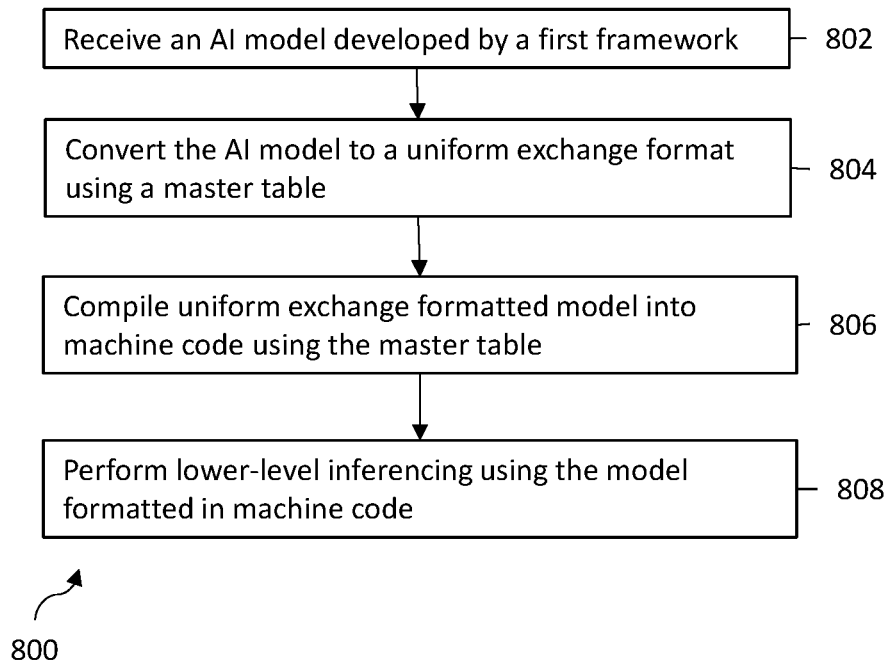
FIG. 8 illustrates a flow diagram of a process for performing an inference phase for an artificial intelligence model in accordance with one or more embodiments of the present invention.

Referring to FIG. 8, a flow diagram 800 of a process for performing an inference phase for an AI model, such as AI model 202 of FIG. 2, is shown in accordance with embodiments of the present invention. It should be appreciated that all or a portion of the processing shown in FIG. 8 can be performed by a computer system, such as system 100 of FIG. 1. At block 802, a converter unit, such as converter unit 204 from FIG. 2 can receive an AI model, which can be a framework-specific model.

At block 704, the converter unit, such converts the AI model to a uniform exchange formatted model, such as uniform exchange formatted model 208 from FIG. 2 using a master table, such as master table 206 from FIG. 2. The converter unit analyzes the received AI model and detects the name (e.g., MNIST). The converter unit then reads the master table to determine whether an entry for the AI model name exists based on the name. If no entry exists, the converter unit creates an entry for a name in the master table and writes the model name to the master table.

The converter unit then analyzes the received AI model to determine the framework type used to generate the AI model. The converter unit is operable to detect and analyze the code associated with the received AI model and identify the framework type. In some instances, a description of the framework type will explicitly be included with the code, and in other instances, the converter unit compares the code with other framework types described in a data structure (dictionary, tree, associative array), in which the different code portions are mapped to different framework types. For example, the AI model code can be mapped to the framework type, Caffe™. The converter unit then reads the entries in the master table associated with the model name of the received AI model to determine whether this framework type has previously been associated with the model name. If the received AI model's name has previously been created, but the framework type associated with the name is different than the framework type of the received AI model, the converter unit can dynamically update the master table reflect the framework type of the received AI model. The converter unit writes the AI model code to the master table and generates a mapping to the identity of the framework type. For example, the converter unit can update the master table to reflect that a framework type associated with the MNIST name is Caffe™ in addition to any previously entered framework type.

The converter unit then determines what library tools and framework method are applicable for converting the AI model to a uniform exchange formatted model based on the determined framework. The converter unit then access the master table for the "Framework/library tool" entry and retrieves a framework specific framework/library toolbox from the master table. For example, for converting an AI generated by a Caffe™ framework to a uniform exchange formatted model, the converter unit retrieves a convolutional neural network (CNN) toolbox. The converter unit further retrieves instruction steps for using the framework/library toolbox for converting the AI model to the uniform open exchange formatted model from the master table. The converter unit further retrieves input name information and output name information. For example, the converter unit can read the master table and retrieve information that for an MNIST model, an input level (e.g., input3) of an input image has to be converted to [1×1×28×28] dimensions. Furthermore, that an output dimensions of the image from the uniform exchange formatted model converted from the MNIST model is [1×10]. The converter unit further retrieves model/framework specific pre-processing information from the master table. For example, the converter unit can retrieve information, that for a uniform exchange formatted model converted from a MNIST model, the pre-processing steps for analyzing an image include resizing and color scaling. The converter unit further retrieves model/framework specific post-processing information from the master table. For example, the converter unit can retrieve information, that for a uniform exchange formatted model converted from a MNIST model, the post-processing steps for analyzing an image include applying a SoftMax function. The converter unit can further retrieve model/environment specific information for optimization from the master table. For example, the converter unit can retrieve information, that for a uniform exchange formatted model converted from a MNIST model, an optimizer fuses consecutive transposes. The converter unit can further retrieve information regarding an accelerator from the master table. For example, the converter unit can retrieve information, that for a uniform exchange formatted model converted from a MNIST model, an accelerator includes an nGraph. This information is used by the converter unit to generate a nGraph for the uniform exchange formatted model. The converter unit applies this information to convert the received AI model to a uniform exchanged formatted model.

At block 806, the converter unit transmits the uniform exchange formatted model to the compiler unit, such as compiler unit, which converts the model to a machine code or assembly language. The compiler unit reengages the master table to convert the uniform exchange formatted model to the machine code or assembly language in accordance with the framework used to generate the AI model. Therefore, the complied uniform exchange formatted model will behave in accordance with the AI model.

At block 808, the inferencing unit 214 from FIG. 2 receives an input 216 from FIG. 2 and generates an output 218 from FIG. 2. The input 216 can be received from, for example, a first data source 102, a second data source 104, and/or a third data source 106 from FIG. 1. The inferencing unit 214 from FIG. 2 further reads the master table 206 from FIG. 2 to cause the output 218 from FIG. 2 to be in accordance with an output of the AI model 202 from FIG. 2. For example, the inferencing unit 214 from FIG. 2 can cause a format of the output 218 from FIG. 2 to be in accordance with a format of an output of the AI model 202 from FIG. 2. The output 218 from FIG. 2 can be transmitted to, for example, the first data destination 108 and/or the second data destination 110 from FIG. 1.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
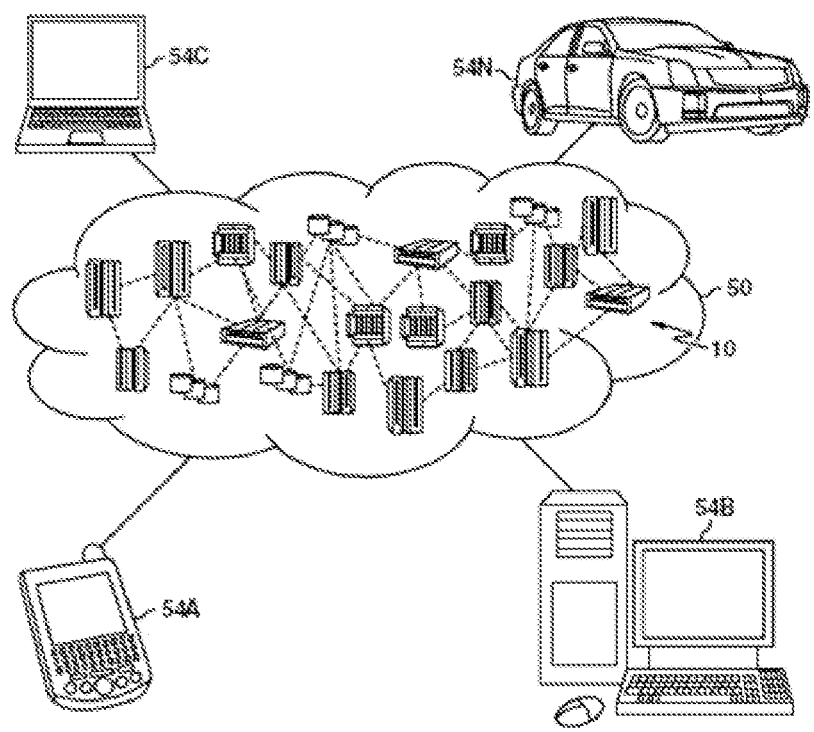
FIG. 9 illustrates a cloud computing environment according to one or more embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 10:
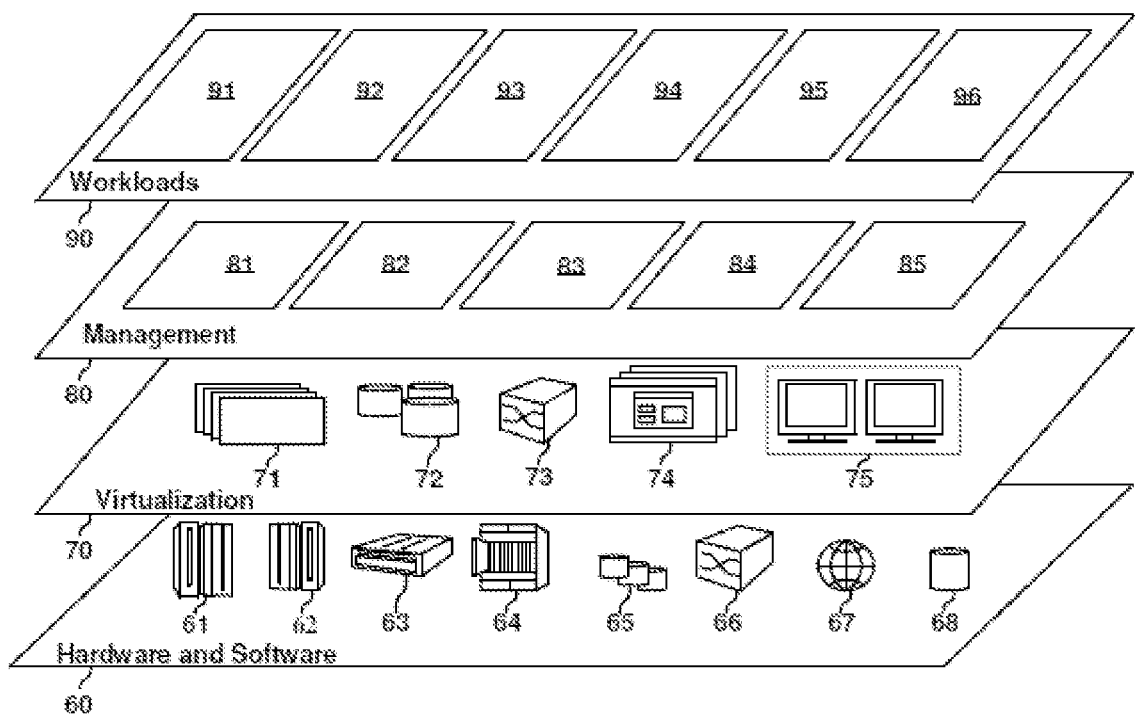
FIG. 10 illustrates abstraction model layers according to one or more embodiments of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtualization 93; data analytics processing 94; transaction processing 95; and uniform AI model conversion 96.

Figure 11:
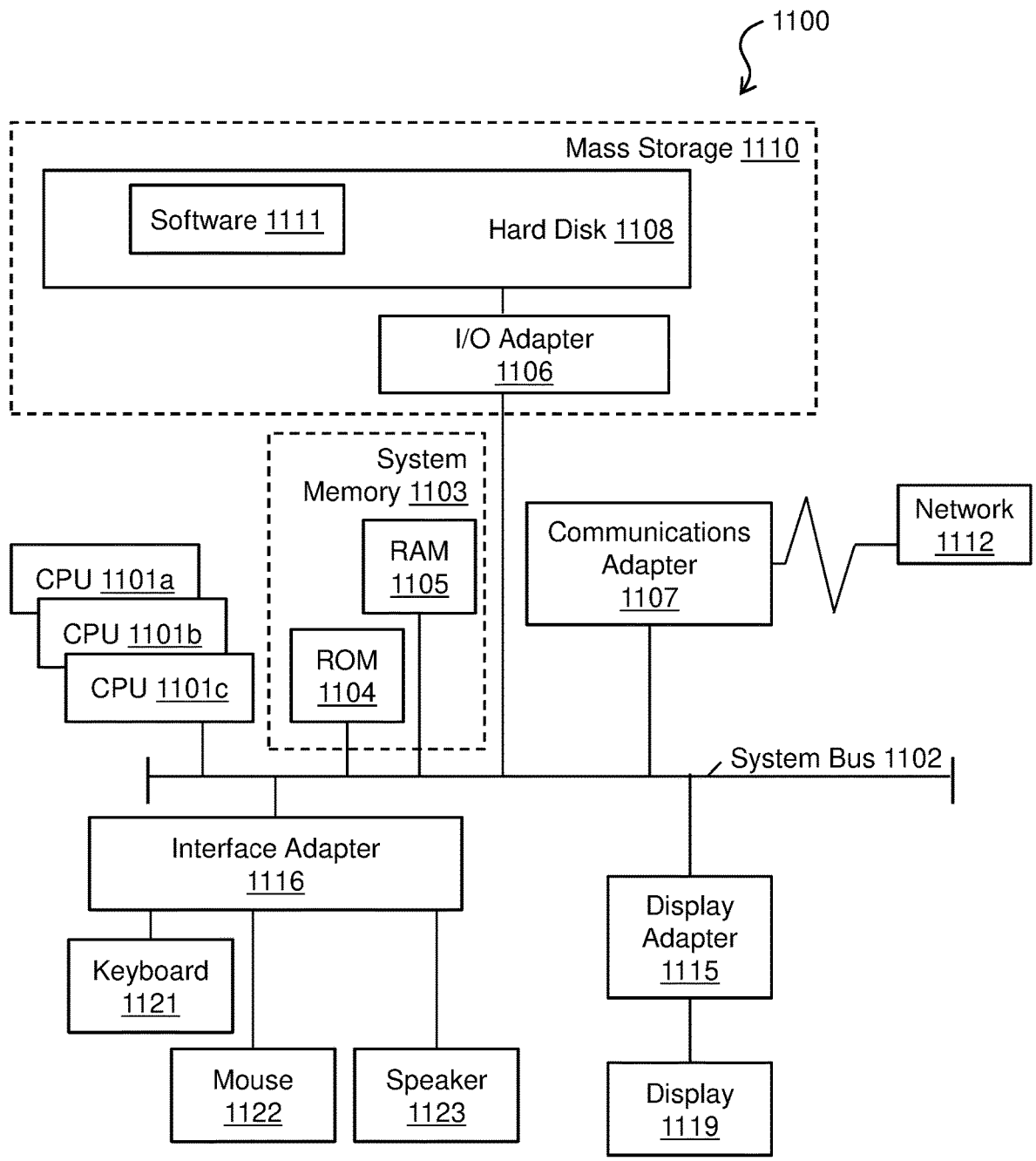
FIG. 11 illustrates a block diagram of a computer system for use in implementing one or more embodiments of the present invention.

As shown in FIG. 11, the computer system 1100 has one or more central processing units (CPU(s)) 1101a, 1101b, 1101c, etc. (collectively or generically referred to as processor(s) 1101). The processors 1001 can be a single-core processor, multi-core processor, computing cluster, or any number of other configurations. The processors 1101, also referred to as processing circuits, are coupled via a system bus 1102 to a system memory 1103 and various other components. The system memory 1103 can include a read only memory (ROM) 1104 and a random access memory (RAM) 1105. The ROM 1104 is coupled to the system bus 1102 and may include a basic input/output system (BIOS), which controls certain basic functions of the computer system 1100. The RAM is read-write memory coupled to the system bus 1102 for use by the processors 1001. The system memory 1103 provides temporary memory space for operations of said instructions during operation. The system memory 1103 can include random access memory (RAM), read only memory, flash memory, or any other suitable memory systems.

The computer system 1100 comprises an input/output (I/O) adapter 1106 and a communications adapter 1107 coupled to the system bus 1102. The I/O adapter 1106 may be a small computer system interface (SCSI) adapter that communicates with a hard disk 1108 and/or any other similar component. The I/O adapter 1106 and the hard disk 1108 are collectively referred to herein as a mass storage 1110.

Software 1111 for execution on the computer system 1100 may be stored in the mass storage 1110. The mass storage 1110 is an example of a tangible storage medium readable by the processors 1101, where the software 1111 is stored as instructions for execution by the processors 1101 to cause the computer system 1100 to operate, such as is described herein below with respect to the various Figures. Examples of computer program product and the execution of such instruction is discussed herein in more detail. The communications adapter 1107 interconnects the system bus 1102 with a network 1112, which may be an outside network, enabling the computer system 1100 to communicate with other such systems. In one embodiment, a portion of the system memory 1103 and the mass storage 1110 collectively store an operating system, which may be any appropriate operating system, such as the z/OS or AIX operating system from IBM Corporation, to coordinate the functions of the various components shown in FIG. 11.

Additional input/output devices are shown as connected to the system bus 1102 via a display adapter 1115 and an interface adapter 1116 and. In one embodiment, the adapters 1106, 1107, 1115, and 1116 may be connected to one or more I/O buses that are connected to the system bus 1102 via an intermediate bus bridge (not shown). A display 1119 (e.g., a screen or a display monitor) is connected to the system bus 1102 by a display adapter 1115, which may include a graphics controller to improve the performance of graphics intensive applications and a video controller. A keyboard 1121, a mouse 1122, a speaker 1123, etc. can be interconnected to the system bus 1102 via the interface adapter 1116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 11, the computer system 1100 includes processing capability in the form of the processors 1101, and, storage capability including the system memory 1103 and the mass storage 1110, input means such as the keyboard 1121 and the mouse 1122, and output capability including the speaker 1123 and the display 1119.

In some embodiments, the communications adapter 1107 can transmit data using any suitable interface or protocol, such as the internet small computer system interface, among others. The network 1112 may be a cellular network, a radio network, a wide area network (WAN), a local area network (LAN), or the Internet, among others. An external computing device may connect to the computer system 1100 through the network 1112. In some examples, an external computing device may be an external webserver or a cloud computing node.

It is to be understood that the block diagram from FIG. 11 is not intended to indicate that the computer system 1100 is to include all of the components shown in FIG. 11. Rather, the computer system 1100 can include any appropriate fewer or additional components not illustrated in FIG. 11 (e.g., additional memory components, embedded controllers, modules, additional network interfaces, etc.). Further, the embodiments described herein with respect to computer system 1100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one"

and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    converting, by a processor, an artificial intelligence (AI) model generated in a first framework among a plurality of different possible frameworks to a uniform exchange formatted model, regardless of the first framework used to generate the AI model, by engaging a master table, which stores different framework-specific instructions corresponding to AI models generated from the plurality of different possible frameworks, to retrieve instructions specific to the first framework for converting from the AI model to the uniform exchange formatted model in accordance with the first framework;
    compiling, by the processor, the uniform exchange formatted model by engaging the master table to retrieve instructions for compiling the uniform exchange formatted model in accordance with the first framework; and
    receiving, by the processor, data as an input to the compiled uniform exchange formatted model and generating an output by engaging the master table to retrieve instructions for generating an output in accordance with the first framework among the plurality of different possible frameworks.

2. The computer-implemented method of claim 1, wherein converting the AI model generated in the first framework to the uniform exchange formatted model comprises:
    identifying an information item of the AI model generated in the first framework;
    determining whether the information item is framework-specific; and
    retrieving, from the master table, instructions for converting the information item based at least in part on the determination of whether the information item is framework-specific.

3. The computer-implemented method of claim 1, wherein compiling the uniform exchange formatted model comprises:
    identifying post-processing information from the uniform exchange formatted model;
    determining whether the post-processing information is framework-specific; and
    retrieving, from the master table, instructions for compiling the post-processing information based at least in part on the determination of whether the post-processing information is framework-specific.

4. The computer-implemented method of claim 1, wherein generating the output comprises:
    determining whether the output is framework-specific; and
    retrieving, from the master table, instructions for generating the output based at least in part on the determination of whether the output is framework-specific.

5. The computer-implemented method of claim 1, wherein the received data is distinct from data used to train the AI model.

6. The computer-implemented of claim 1, wherein converting the AI model generated in the first framework to the uniform exchange formatted model comprises retrieving a kernel function to modify non-linear data to linear data.

7. The computer implemented method of claim 1, wherein the received data is in a non-linear format.

8. A system comprising:
    a memory having computer readable instructions; and
    one or more processors for executing the computer readable instructions, the computer readable instructions controlling the one or more processors to perform operations comprising:
        converting an artificial intelligence (AI) model generated in a first framework among a plurality of different possible frameworks to a uniform exchange formatted model, regardless of the first framework used to generate the AI model, by engaging a master table, which stores different framework-specific instructions corresponding to AI models generated from the plurality of different possible frameworks, to retrieve instructions specific to the first framework for converting from the AI model to the uniform exchange formatted model in accordance with the first framework;
        compiling the uniform exchange formatted model by engaging the master table to retrieve instructions for compiling the uniform exchange formatted model in accordance with the first framework; and
        receiving data as an input to the compiled uniform exchange formatted model and generating an output by engaging the master table to retrieve instructions for generating an output in accordance with the first framework among the plurality of different possible frameworks.

9. The system of claim 8, wherein converting the AI model generated in the first framework to the uniform exchange formatted model comprises:
    identifying an information item of the AI model generated in the first framework;
    determining whether the information item is framework-specific; and
    retrieving, from the master table, instructions for converting the information item based at least in part on the determination of whether the information item is framework-specific.

10. The system of claim 8, wherein compiling the uniform exchange formatted model comprises:
    identifying post-processing information from the uniform exchange formatted model;
    determining whether the post-processing information is framework-specific; and
    retrieving, from the master table, instructions for compiling the post-processing information based at least in part on the determination of whether the post-processing information is framework-specific.

11. The system of claim 8, wherein generating the output comprises:
   determining whether the output is framework-specific; and
   retrieving, from the master table, instructions for generating the output based at least in part on the determination of whether the output is framework-specific.

12. The system of claim 8, wherein the received data is distinct from data used to train the AI model.

13. The system of claim 8, wherein converting the AI model generated in the first framework to the uniform exchange formatted model comprises retrieving a kernel function to modify non-linear data to linear data.

14. The system of claim 8, wherein the received data is in a non-linear format.

15. A computer program product comprising a computer readable storage medium having program instructions embodied therewith, the program instructions executable by a processor to cause the processor to perform operations comprising:
   converting an artificial intelligence (AI) model generated in a first framework among a plurality of different possible frameworks to a uniform exchange formatted model, regardless of the first framework used to generate the AI model, by engaging a master table, which stores different framework-specific instructions corresponding to AI models generated from the plurality of different possible frameworks, to retrieve instructions specific to the first framework for converting from the AI model to the uniform exchange formatted model in accordance with the first framework;
   compiling the uniform exchange formatted model by engaging the master table to retrieve instructions for compiling the uniform exchange formatted model in accordance with the first framework; and
   receiving data as an input to the compiled uniform exchange formatted model and generating an output by engaging the master table to retrieve instructions for generating an output in accordance with the first framework among the plurality of different possible frameworks.

16. The computer program product of claim 15, wherein converting the AI model generated in the first framework to the uniform exchange formatted model comprises:
   identifying an information item of the AI model generated in the first framework;
   determining whether the information item is framework-specific; and
   retrieving, from the master table, instructions for converting the information item based at least in part on the determination of whether the information item is framework-specific.

17. The computer program product of claim 15, wherein compiling the uniform exchange formatted model comprises:
   identifying post-processing information from the uniform exchange formatted model;
   determining whether the post-processing information is framework-specific; and
   retrieving, from the master table, instructions for compiling the post-processing information based at least in part on the determination of whether the post-processing information is framework-specific.

18. The computer program product of claim 15, wherein generating the output comprises:
   determining whether the output is framework-specific; and
   retrieving from the master table instructions for generating the output, based at least in part on the determination of whether the output is framework-specific.

19. The computer program product of claim 15, wherein the received data is distinct from data used to train the AI model.

20. The computer program product of claim 15, wherein converting the AI model generated in the first framework to the uniform exchange formatted model comprises retrieving a kernel function to modify non-linear data to linear data.

21. A system comprising:
   a memory having computer readable instructions; and
   one or more processors for executing the computer readable instructions, the computer readable instructions controlling the one or more processors to perform operations comprising:
      receiving an electronic document that describes a process for converting an artificial intelligence (AI) model generated in a first framework among a plurality of different possible frameworks to a uniform exchange formatted model;
      retrieving, via natural language processing techniques, instructions for converting the AI model to a uniform exchange formatted model from the electronic document;
      associating, by the processor, the instructions to machine code for performing the instructions;
      writing the instructions to a master table such that the master table stores different framework-specific instructions corresponding to AI models generated from the plurality of different possible frameworks;
      mapping the instructions to the machine code;
      compiling the machine code of the uniform exchange formatted model based at least in part on the instructions; and
      receiving, by the processor, data as an input to the compiled uniform exchange formatted model and generating an output by engaging the master table to retrieve instructions for generating an output in accordance with the first framework among the plurality of different possible frameworks.

22. The system of claim 21, wherein the instructions are AI model framework specific instructions.

23. The system of claim 21, wherein the instructions comprise at least one of pre-processing instructions, post-processing instructions, input instructions, and output instructions.

24. The system of claim 21, wherein the instructions are AI model type specific.

25. A computer-implemented method comprising:
   retrieving, by a processor and via natural language processing techniques, instructions for converting an artificial intelligence (AI) model generated in a first framework among a plurality of different possible frameworks to a uniform exchange formatted model from an electronic document;
   associating, by the processor, the instructions to machine code for performing the instructions;
   writing, by the processor, the instructions to a master table such that the master table stores different framework-specific instructions corresponding to AI models generated from the plurality of different possible frameworks; and
   mapping, by the processor, the instructions to machine code for executing the instructions; and converting, by the processor, the artificial intelligence (AI) model to the uniform exchange formatted model among the plurality of different possible frameworks using the machine code.

* * * * *